United States Patent
Wan et al.

(10) Patent No.: US 9,736,063 B2
(45) Date of Patent: Aug. 15, 2017

(54) SERVICE CHAINING USING SOURCE ROUTING

(71) Applicant: Huawei Technologies Co., Ltd., Shenzhen (CN)

(72) Inventors: Tao Wan, Ottawa (CA); Peter Ashwood-Smith, Gatineau (CA); Mehdi Arashmid Akhavain Mohammadi, Ottawa (CA); Yapeng Wu, Nepean (CA); Xingjun Chu, Ottawa (CA); Guoli Yin, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 283 days.

(21) Appl. No.: 14/623,842

(22) Filed: Feb. 17, 2015

(65) Prior Publication Data

US 2016/0241460 A1    Aug. 18, 2016

(51) Int. Cl.
*H04L 12/721* (2013.01)
*H04L 12/725* (2013.01)

(52) U.S. Cl.
CPC ............ *H04L 45/34* (2013.01); *H04L 45/306* (2013.01)

(58) Field of Classification Search
None
See application file for complete search history.

(56) References Cited

U.S. PATENT DOCUMENTS

| | | | |
|---|---|---|---|
| 2003/0188190 A1* | 10/2003 | Aaron | H04L 63/1408 726/23 |
| 2005/0094630 A1* | 5/2005 | Valdevit | H04L 45/12 370/360 |
| 2007/0038767 A1* | 2/2007 | Miles | H04L 45/22 709/230 |
| 2013/0272305 A1 | 10/2013 | Lefebvre et al. | |
| 2014/0241345 A1* | 8/2014 | DeCusatis | H04L 49/25 370/355 |

(Continued)

FOREIGN PATENT DOCUMENTS

| | | |
|---|---|---|
| CN | 103888357 A | 6/2014 |
| WO | 2014169251 A1 | 10/2014 |

OTHER PUBLICATIONS

Previdi, S. Ed., et al., "IPv6 Segment Routing Header (SRH)," draft-previdi-6man-segment-routing-header-00, Mar. 5, 2014, 22 pages.

(Continued)

*Primary Examiner* — Christine Duong
(74) *Attorney, Agent, or Firm* — Conley Rose, P.C.

(57) ABSTRACT

A service chaining method comprising receiving a source routed data packet, wherein the source routed data packet comprises a destination address and identifies a plurality of next-hops along a service chain path, identifying a next-hop for the source routed data packet using the plurality of next-hops, determining whether the next-hop is source routing capable, setting the destination address of the source routed data packet in accordance with the determination, wherein the destination address is set to the next-hop when the next-hop is source routing capable, and wherein the destination address is set to a next downstream network node that is source routing capable when the next-hop is not source routing capable, and forwarding the source routed data packet to the next-hop.

16 Claims, 6 Drawing Sheets

(56) References Cited

U.S. PATENT DOCUMENTS

2014/0321452 A1    10/2014  Choi et al.
2016/0226766 A1*   8/2016   Al-Zoubi .............. H04L 45/745

OTHER PUBLICATIONS

Previdi, S., Ed., et al., "IPv6 Segment Routing Header (SRH)," draft-previdi-6man-segment-routing-header-01, Jun. 9, 2014, 28 pages.
Previdi, S., Ed., et al., "IPv6 Segment Routing Header (SRH)," draft-previdi-6man-segment-routing-header-02, Jul. 3, 2014, 24 pages.
Previdi, S., Ed., et al., "IPv6 Segment Routing Header (SRH)," draft-previdi-6man-segment-routing-header-03, Oct. 24, 2014, 24 pages.
Previdi, S., Ed., et al., "IPv6 Segment Routing Header (SRH)," draft-previdi-6man-segment-routing-header-04, Nov. 12, 2014, 24 pages.
Previdi, S., Ed., et al., "IPv6 Segment Routing Header (SRH)," draft-previdi-6man-segment-routing-header-05, Jan. 12, 2015, 23 pages.
Foreign Communication From a Counterpart Application, PCT Application No. PCT/CN2016/073696, English Translation of International Search Report dated May 13, 2016, 7 pages.
Foreign Communication From a Counterpart Application, PCT Application No. PCT/CN2016/073696, English Translation of Written Opinion dated May 13, 2016, 4 pages.

* cited by examiner

SERVICE CHAINING USING SOURCE ROUTING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

When communicating data traffic within a network, one of the customer requirements may be the ability to enforce policies in a physical network infrastructure and/or in a virtual network infrastructure. In a physical network infrastructure, physical appliances, devices, and cables may be used to form a physical topology for implementing and/or enforcing policies. In a virtual network infrastructure, a physical topology may not be feasible for enforcing policies. For example, in a data center a middle-box appliance may be virtual and may be located anywhere within the data center. A service chain and/or a forwarding graph in a network function virtualization (NFV) may be used in a virtual environment to provide policy enforcement. Segment routing may also be employed to implement a service chain. However, employing segment routing requires each network node (e.g., service node) along a route to be segment routing capable and is limited to network nodes with segment routing capabilities to properly handle and/or route data packets. As such, it is desirable to implement service chains using network nodes with a variety of routing capabilities.

SUMMARY

In one embodiment, the disclosure includes a service chaining method comprising receiving a source routed data packet that comprises a destination address, and wherein the source routed data packet identifies a plurality of next-hops along a service chain path, identifying a next-hop for the source routed data packet using the plurality of next-hops, determining whether the next-hop is source routing capable, setting the destination address of the source routed data packet in accordance with the determination, wherein the destination address is set to the next-hop when the next-hop is source routing capable, and wherein the destination address is set to a next downstream network node that is source routing capable when the next-hop is not source routing capable, and forwarding the source routed data packet to the next-hop.

In another embodiment, the disclosure includes an apparatus comprising a receiver configured to receive a source routed data packet, wherein the source routed data packet comprises a destination address and a plurality of next-hops along a service chain path, and a processor coupled to a memory and the receiver, wherein the memory comprises computer executable instructions stored in a non-transitory computer readable medium such that when executed by the processor causes the processor to identify a next-hop for the source routed data packet from the plurality of next-hops, determine whether the next-hop is source routing capable, set the destination address of the source routed data packet in accordance with the determination, wherein the destination address is set to the next-hop when the next-hop is source routing capable, and wherein the destination address is set to a next downstream network node that is source routing capable when the next-hop is not source routing capable, and forward the source routed data packet to the next-hop.

In yet another embodiment, the disclosure includes a source routing method comprising receiving a data packet that comprises a destination address, a source address, and a payload, determining a plurality of next-hops along a service chain path between the source address and the destination address, generating a source routed data packet that comprises the destination address, the source address, the plurality of next-hops, and the payload, setting the destination address of the source routed data packet to a first next-hop from the plurality of next-hops along the service chain path, and forwarding the source routed data packet in accordance with the destination address.

In yet another embodiment, the disclosure includes an apparatus comprising a receiver configured to receive a data packet that comprises a destination address, a source address, and a payload, a processor coupled to a memory and the receiver, wherein the memory comprises computer executable instructions stored in a non-transitory computer readable medium such that when executed by the processor causes the processor to determine a plurality of next-hops along a service chain path between the source address and the destination address, generate a source routed data packet that comprises the destination address, the source address, the plurality of next-hops, and the payload, set the destination address of the source routed data packet to a first next-hop from the plurality of next-hops along the service chain path, and forward the source routed data packet in accordance with the destination address.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for providing service chain capabilities using source routing within a network that comprises source routing capable network nodes, as well as other network nodes having a variety of routing capabilities. Various embodiments allow source routing incapable network nodes (e.g., firewalls and intrusion prevention systems (IPS)) to appear in a service chain path when using source routing. As such, a variety of network nodes that comprise both source routing capable network nodes and source routing incapable network nodes can be employed to implement a service chain using source routing. In an embodiment, the network nodes are configured to receive a source routed data packet, determine whether the next-hop along a service chain path for the source routed data packet is source routing capable, and forward the source routed data packet accordingly.

Figure 1:
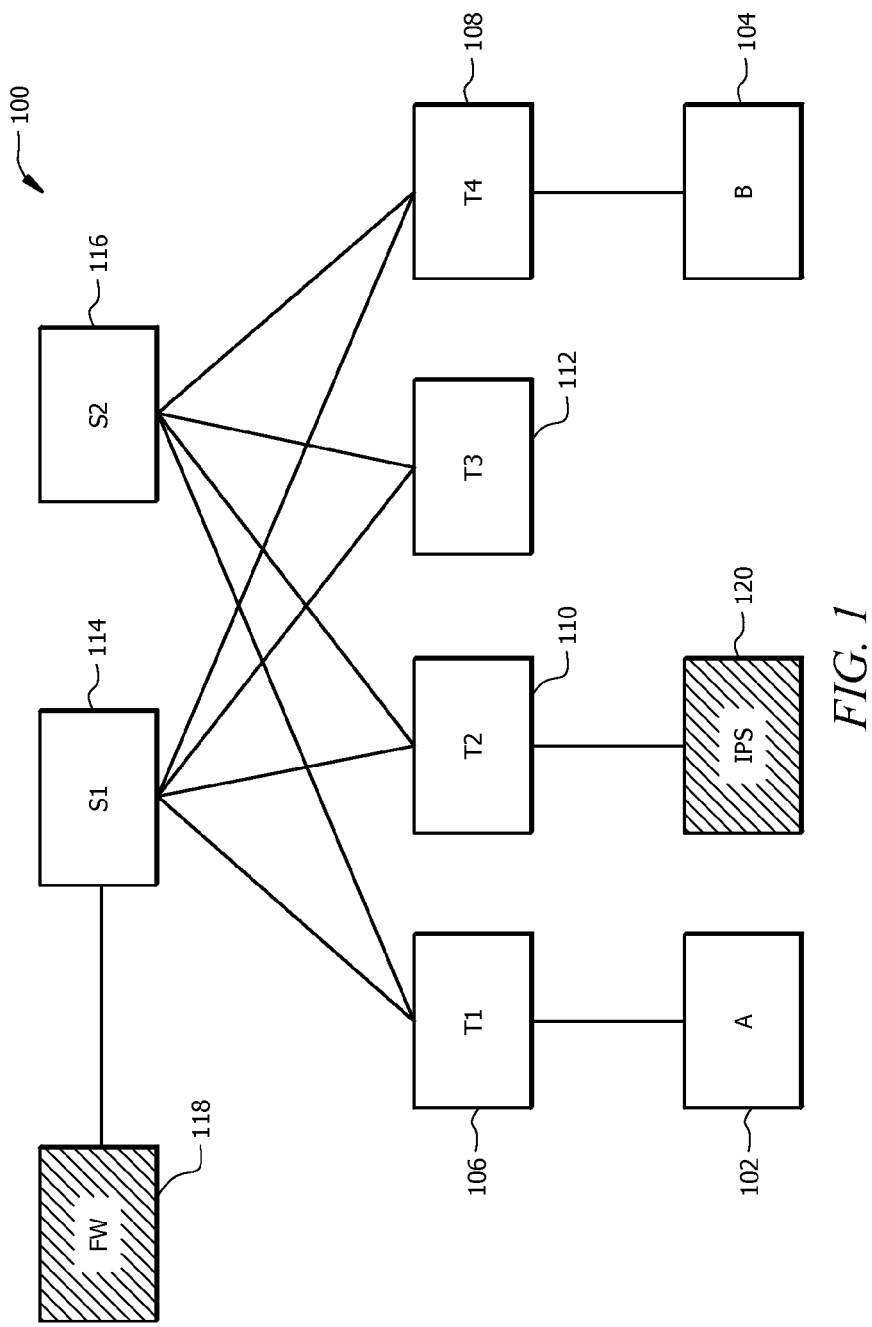
FIG. 1 is a schematic diagram of an embodiment of a network.

FIG. 1 is a schematic diagram of an embodiment of a network 100 where an embodiment of the present disclosure operates. Network 100 comprises a plurality of network nodes 102-120 that support the transportation of data traffic (e.g., data packets) through the network 100. Network nodes 102-120 are configured to implement a service chain through the network 100. In an embodiment, network node 102 is configured as a source network node, network node 104 is configured as a destination network node, network node 106 is configured as an ingress network node, network node 108 is configured as an egress network node, network nodes 110-116 are configured as switches or routers, network node 118 is configured as a firewall, and network node 120 is configured as an IPS. Network nodes 102-120 are source routing capable and/or not source routing capable. A network node that is source routing capable is configured to process a source routed data packet (e.g., source routed data packet 300 described in FIG. 3). A network node that is not source routing capable is not configured to process a source routed data packet. In FIG. 1, network nodes 104-116 are source routing capable and network node 102, 118, and 120 are not source routing capable.

The network nodes 102-120 are coupled to one another via a plurality of links and/or tunnels. Links discussed herein may be physical links, such as, electrical links, optical links, and/or logical links (e.g., virtual links) used to transport data. A tunnel includes, but is not limited to, an Internet Protocol (IP) security (IPsec) tunnel or a generic routing encapsulation (GRE) tunnel. Network 100 is configured to implement a service chain by providing a service chain path from a source network node (e.g., network node 102) to a destination network node (e.g., network node 104) via one or more other network nodes within the network 100. A service chain path is configured to provide and/or to enforce one or more applications or policies on data traffic as it passes through the network 100. A service chain, or a service function chain, comprises of a set of service functions in an order that are applied to selected data packets or frames. Policies include, but are not limited to, quality of service (QoS) parameters, bandwidth parameters, and security policies. An example of a policy is a data packet that is destined to a web application, but that must go through a firewall before reaching the web application. A service chain path may comprise a plurality of network nodes that are source routing capable, as well as, one or more network nodes that are not source routing capable. When a service chain comprises a network node that is not source routing capable, the network node that is not source routing capable is coupled to one or more adjacent network nodes that are source routing capable. For example, network node 118 is coupled to network node 114 and network node 120 is coupled to network node 110.

While the embodiment shown in FIG. 1 is disclosed with respect to a particular configuration of network nodes 102-120, it is noted that the network 100 may comprise any suitable number of network nodes 102-120. Network 100 may also comprise any configuration of network nodes 102-120 as would be appreciated by one of ordinary skill in the art upon viewing this disclosure.

Figure 2:
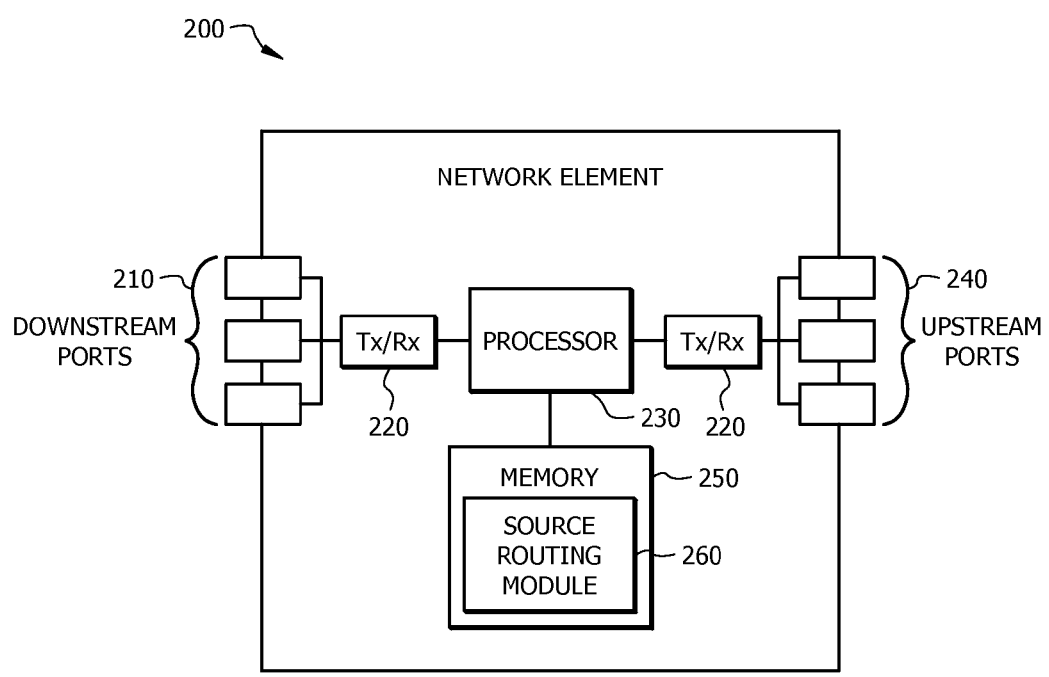
FIG. 2 is a schematic diagram of an embodiment of a network element.

FIG. 2 is a schematic diagram of an embodiment of a network element 200 that is used to transport and process data traffic through at least a portion of the network 100 shown in FIG. 1. For example, network element 200 may be implemented in and/or integrated within a network node 102-120 described in FIG. 1. At least some of the features/methods described in the disclosure may be implemented in the network element 200. For instance, the features/methods of the disclosure may be implemented in hardware, firmware, and/or software installed to run on the hardware. The network element 200 may be any device (e.g., a modem, a switch, router, bridge, server, client, etc.) that transports data through a network, system, and/or domain. Moreover, the terms network "element," "node," "component," "module," and/or similar terms may be interchangeably used to generally describe a network device and do not have a particular or special meaning unless otherwise specifically stated and/or claimed within the disclosure. In one embodiment, the network element 200 may be an apparatus configured to implement service chaining using source routing and to communicate data packets through a network.

The network element 200 comprises one or more downstream ports 210 coupled to a transceiver (Tx/Rx) 220, which may be transmitters, receivers, or combinations thereof. The Tx/Rx 220 transmits and/or receives frames from other network nodes via the downstream ports 210. Similarly, the network element 200 comprises another Tx/Rx 220 coupled to a plurality of upstream ports 240, wherein the Tx/Rx 220 transmits and/or receives frames from other nodes via the upstream ports 240. The downstream ports 210 and/or the upstream ports 240 may include electrical and/or optical transmitting and/or receiving components.

A processor 230 is coupled to the Tx/Rx 220 and is configured to process the frames and/or determine which network nodes to send (e.g., transmit) the packets. In an embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 is configured to implement service chaining using source routing and to communicate data packets through a network.

FIG. 2 illustrates that a memory module 250 is coupled to the processor 230 and may be a non-transitory medium configured to store various types of data. Memory module 250 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the various example embodiments described herein. In one example embodiment, the memory module 250 comprises a source routing module 260 that is implemented on the processor 230. In one embodiment, the source routing module 260 may be implemented to communicate data packets through a network, to employ source routing, and/or to implement service chaining using source routing. For example, the source routing module 260 is configured to implement a service chain using source routing to forward data packets through a network that comprises a source routing capable network node and/or source routing incapable network node. In an embodiment, such may be done according to service chaining method 500 and/or service chaining method 600. Source routing module 260 may be implemented in a transmitter (Tx), a receiver (Rx), or both.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
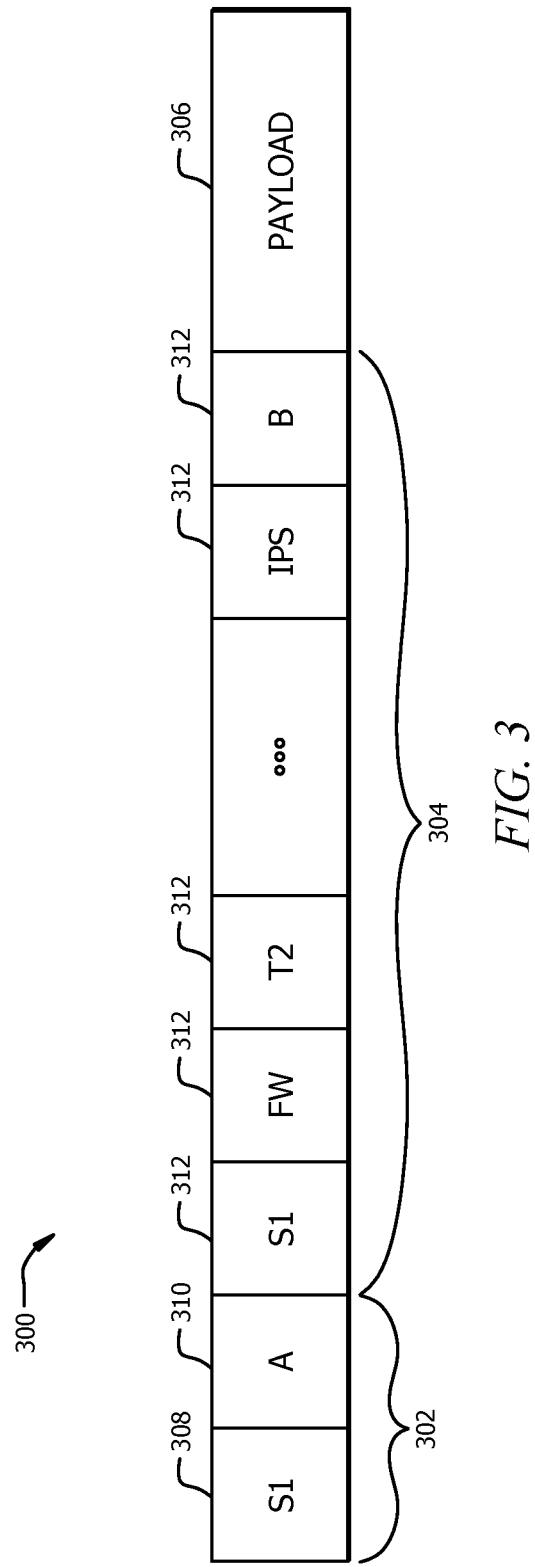
FIG. 3 is a schematic diagram of an embodiment of a source routed data packet.

FIG. 3 is a schematic diagram of an embodiment of a source routed data packet 300. In an embodiment, the source routed data packet 300 is used to forward data content through a network. For example, a source routed data packet 300 is communicated through network 100 by the plurality of network nodes 102-120 described in FIG. 1. The source routed data packet 300 generally comprises a header portion 302, a routing portion 304, and a payload portion 306. The header portion 302 comprises a destination address field 308 and a source address field 310 for routing a data packet through a network. In an embodiment, the header portion 302 is an IP header and supports IP address (e.g., IP version 4 (IPv4) addresses and/or IP version 6 (IPv6) addresses). The routing portion 304 comprises a plurality of entries and/or identifies a plurality of next-hops 312 (e.g., next-hop network nodes) for a data packet to traverse along a path (e.g., a service chain path and/or a source routed path). A next-hop 312 may be identified using an IP address, a media access control (MAC) address, or any other suitable identifier as would be appreciated by one of ordinary skill in the art upon viewing this disclosure. The plurality of next-hops 312 may comprise network nodes that are source routing capable, as well as, network nodes that are not source routing capable. In an embodiment, the routing portion 304 and/or each next-hop 312 comprise one or more flag bits to indicate whether or not a next-hop 312 is source routing capable. For example, when each next-hop 312 comprises a flag bit, the flag bit is set to a first value (e.g., a value of one) to indicate the next-hop 312 is source routing capable and is set to a second value (e.g., a value of zero) to indicate the next-hop 312 is not source routing capable. Alternatively, the source routed data packet 300 comprises one or more additional fields and/or flags to indicate whether a next-hop 312 is source routing capable. The payload portion 306 comprises a payload or data content.

Figure 4:
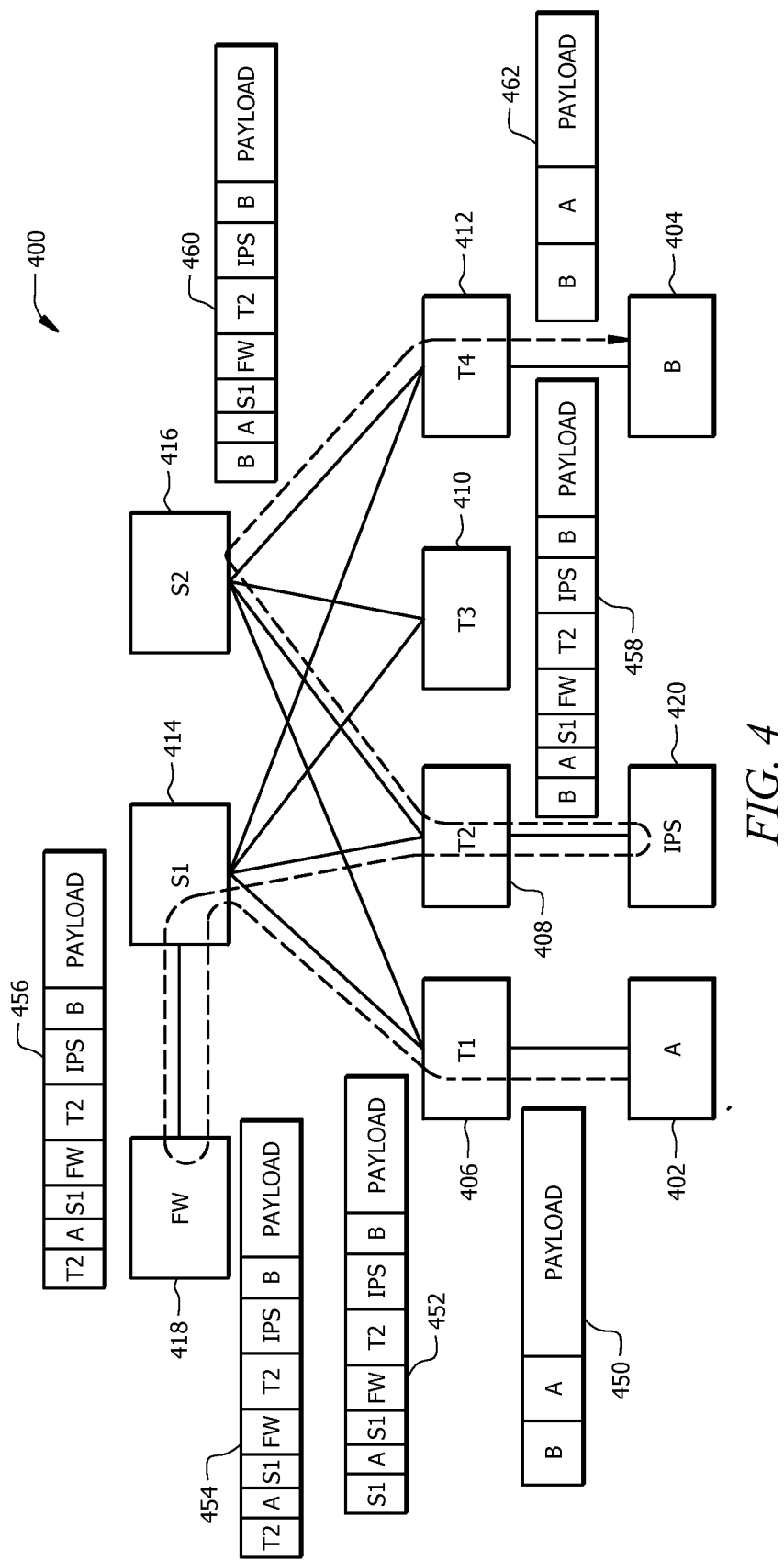
FIG. 4 is a schematic diagram of an embodiment of a network implementing service chaining using a source routed data packet.

FIG. 4 is a schematic diagram of an embodiment of a network 400 implementing service chaining using a source routed data packet. Network 400 comprises a plurality of network nodes 402-420. Network 400 and network nodes 402-420 are configured similar to network 100 and network nodes 102-120 described in FIG. 1, respectively. Network 400 is configured to communicate data traffic (e.g., data packets) from network node 402 to network node 404 using a service chain and source routing. Network node 402 is configured to send data packet 450 to network node 406. Data packet 450 comprises a destination address (e.g., B), a source address (e.g., A), and a payload. Network node 406 is configured to receive data packet 450 and to generate a source routed data packet 452. Source routed data packet 452 is configured similar to source routed data packet 300 described in FIG. 3. Source routed data packet 452 comprises a list of next-hops that indicates a path along a service chain through network 400. For example, the list of next-hops (e.g., S1, FW, T2, IPS, and B) indicates a service chain path that comprises network nodes 414, 418, 408, 420, and 404. The destination address of the source routed data packet 452 is set to the first entry (e.g., S1) from the list of next-hops, for example, the destination address is set to network node 414. The source address and the payload of the source routed data packet 452 is about the same as the source address and the payload of data packet 450. Network node 406 is configured to forward data packet 452 to network node 414 in accordance with the destination address.

Network node 414 is configured to receive source routed data packet 452 and to generate source routed data packet 454. Network node 414 is configured to determine the source routed data packet 452 has reached the destination address indicated by the source routed data packet 452 and to process source routed data packet 452 to generate source routed data packet 454. Network node 414 is configured to determine that network node 418 is the next-hop using the list of next-hops in source routed data packet 452. Network node 414 is also configured to determine that network node 418 is not a source routing capable network node. For example, network node 414 may examine a flag bit and/or use network topology information to determine that network node 418 is not a source routing capable network node. Network topology information comprises a table that describes the capabilities (e.g., source routing capable) of a plurality of network nodes. Network node 414 is configured to set the destination address of source routed data packet 452 to the next source routing capable network node (e.g., T2) in the list of next-hops. As such, network node 414 sets the destination address to network node 408, instead of network node 418, and thereby generates source routed data packet 454. Network node 414 is configured to forward source routed data packet 454 to network node 418. Network node 418 is configured to receive source routed data packet 454 and to generate source routed data packet 456. Network node 418 is configured to enforce one or more policies onto source routed data packet 454 and thereby generates source routed data packet 456. The destination address of source routed data packet 456 is preserved (e.g., maintained) and is about the same as the destination address of source routed data packet 454. Network node 418 is configured to forward source routed data packet 456 toward network node 408 in accordance with the destination address. Network node 414 is configured to receive source routed data packet 456 and to determine that source routed data packet 456 has not reached the destination address indicated by the source routed data packet 456. Network node 414 is configured to forward source routed data packet 456 to network node 408 in accordance with the destination address. For example, network node 414 forwards source routed data packet 456 using network topology information to route source routed data packet 456 to a next-hop towards the destination address.

Network node 408 is configured to receive source routed data packet 456 and to generate source routed data packet 458. Network node 408 is configured to determine the source routed data packet 456 has reached the destination address indicated by the source routed data packet 456 and to process source routed data packet 456 to generate source routed data packet 458. Network node 408 is configured to determine that network node 420 is the next-hop using the list of next-hops in source routed data packet 456. Network node 408 is also configured to determine that network node 420 is not a source routing capable network node. Network node 408 is configured to set the destination address of source routed data packet 456 to the next source routing capable network node (e.g., B) in the list of next-hops. As such, network node 408 sets the destination address to network node 404, instead of network node 420, and thereby generates source routed data packet 458. Network node 408 is configured to forward source routed data packet 458 to network node 420. Network node 420 is configured to receive source routed data packet 458 and to generate source routed data packet 460. Network node 420 is configured to enforce one or more policies onto source routed data packet 458 and thereby generates source routed data packet 460. The destination address of source routed data packet 460 is preserved (e.g., maintained) and is about the same as the destination address of source routed data packet 458. Network node 420 is configured to forward source routed data packet 460 toward network node 404 in accordance with the destination address. Network node 408 is configured to receive source routed data packet 460 and to determine that source routed data packet 460 has not reached the destination address indicated by the source routed data packet 460. Network node 408 is configured to forward source routed data packet 460 to network node 416 towards the destination address. Network node 416 is configured to receive source routed data packet 460 and to determine that source routed data packet 460 has not reached the destination address indicated by the source routed data packet 460. Network node 416 is configured to forward source routed data packet 460 to network node 412 towards the destination address.

Network node 412 is configured to receive source routed data packet 460 and to determine that the destination address references a next-hop for network node 412. Network node 412 is configured to remove one or fields and/or portions of the source routed data packet 460, and thereby generates data packet 462. For example, network node 412 removes the list of next-hops and/or the routing portion from source routed data packet 460. The destination address, the source address, and the payload of data packet 462 is about the same as in source routed data packet 460. Network node 412 is configured to forward data packet 462 to network node 404. Network node 404 is configured to receive data packet 462 and to further process data packet 462.

Figure 5:
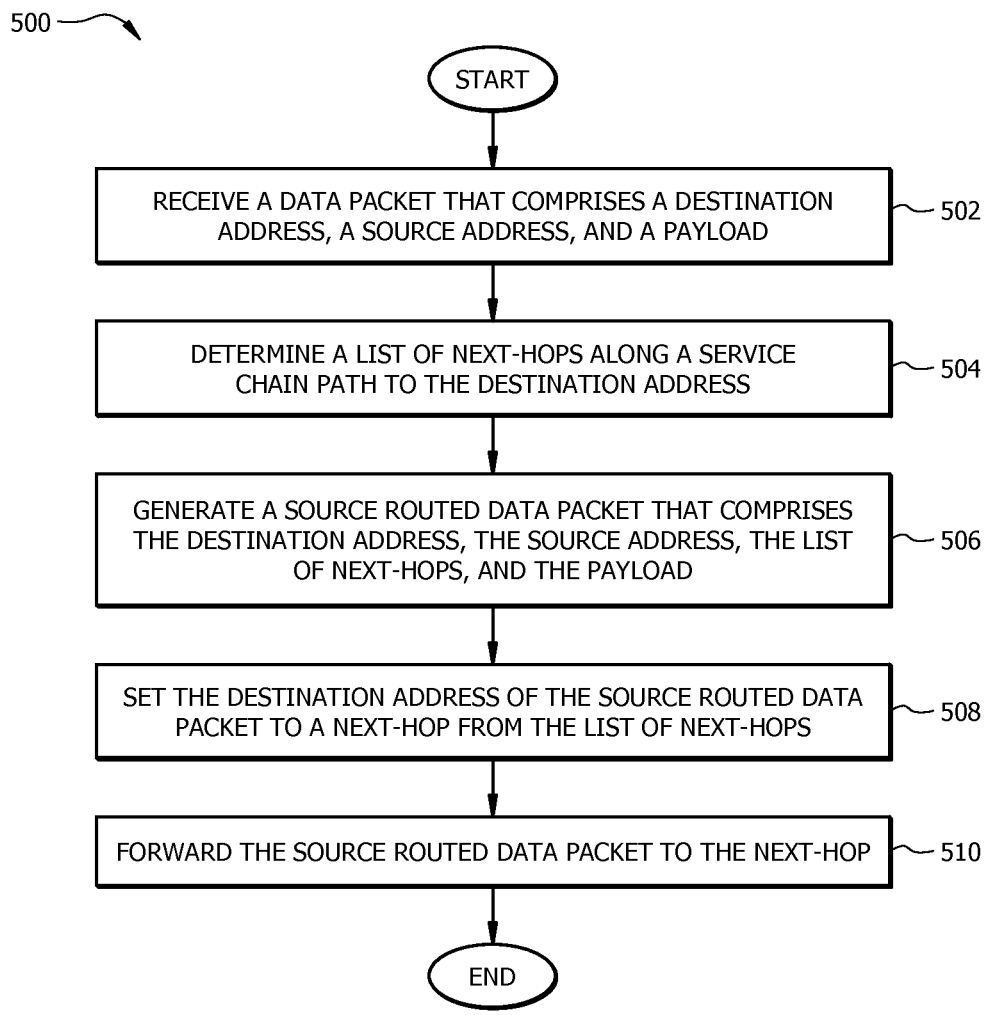
FIG. 5 is a flowchart of an embodiment of a service chaining method.

FIG. 5 is a flowchart of an embodiment of a service chaining method 500 for a network node and may be similar to source routing module 260 described in FIG. 2. In an embodiment, a network node (e.g., network node 406 described in FIG. 4) is configured to receive a data packet, to generate a source routed data packet for a service chain path, and to forward the source routed data packet to a next-hop network node along the service chain path. At step 502, the network node receives a data packet that comprises a destination address, a source address, and a payload. At step 504, the network node determines a list of next-hops along a service chain path to the destination address. The service chain path may comprise a plurality of network nodes that are source routing capable, as well as, one or more network nodes that are not source routing capable. The network node generates the list of next-hops (e.g., next-hop network nodes) along the service chain path to the destination address using network operator information, network topology information, a database, a routing table, and/or any other suitable mechanism as would be appreciated by one of ordinary skill in the art. At step 506, the network node generates a source routed data packet that comprises the destination address, the source address, the list of next-hops, and the payload. For example, the source routed data packet is configured similar to source routed data packet 300 described in FIG. 3. At step 508, the network node sets the destination address in the source routed data packet to the first entry from the list of next-hops. At step 510, the network node forwards the source routed data packet to the next-hop network node indicated by the destination address of the source routed data packet.

Figure 6:
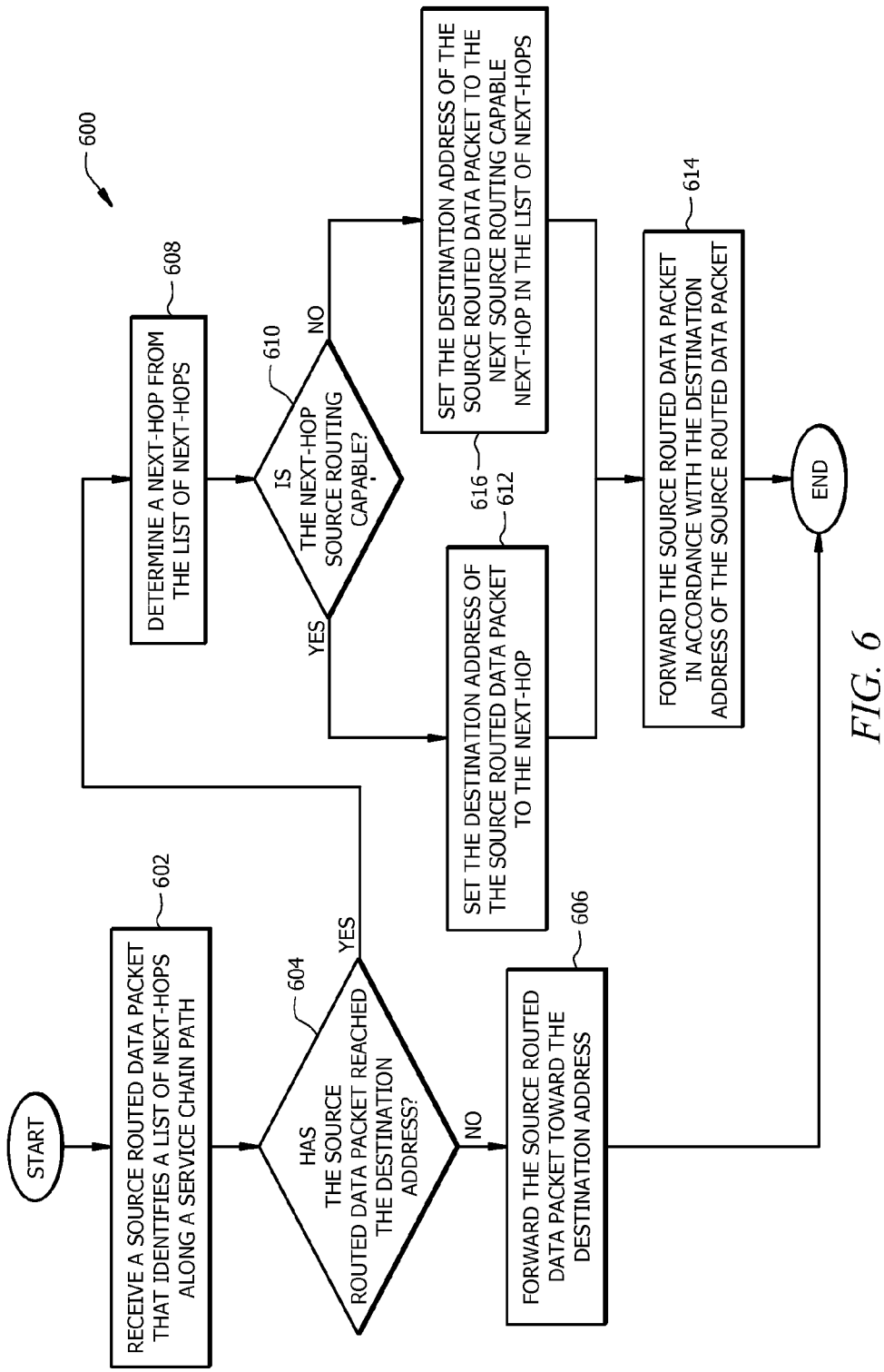
FIG. 6 is a flowchart of another embodiment of a service chaining method.

FIG. 6 is a flowchart of another embodiment of a service chaining method 600 for a network node and may be similar to source routing module 260 described in FIG. 2. In an embodiment, a network node (e.g., network node 414 described in FIG. 4) is configured to receive a source routed data packet, to determine whether the next-hop along a service chain path for the source routed data packet is source routing capable, and to forward the source routed data packet accordingly. At step 602, the network node receives a source routed data packet that identifies a list of next-hops (e.g., next-hop network nodes) along a service chain path. The service chain path may comprise a plurality of network nodes that are source routing capable, as well as, one or more network nodes that are not source routing capable. In an embodiment, the source routed data packet is similar to source routed data packet 300 described in FIG. 3. At step 604, the network node determines whether the source routed data packet has reached the destination address. For example, the network node examines the destination address of the source routed data packet to determine if the network node is identified as the destination for the source routed data packet. When the source routed data packet has reached the destination address, the network node proceeds to step 608; otherwise, the network node proceeds to step 606. At step 606, the network node forwards the source routed data packet towards the destination address. For example, the network node forwards the source routed data packet to another network node and towards the destination address using a lookup table, a routing table, network topology information, and/or any other suitable routing protocol as would be appreciated by one of ordinary skill in the art upon viewing this disclosure.

Returning to step 604, when the source routed data packet has reached the destination address, the network node proceeds to step 608. At step 608, the network node determines a next-hop from the list of next-hops in the source routed data packet. At step 610, the network node may determine whether the next-hop from the list of next-hops is source routing capable. For example, the network node examines one or more flag bits in the source routed data packet, to determine whether the next-hop is source routing capable. In an alternative embodiment, the network node uses information provided by a controller and/or a network operator to determine whether the next-hop is source routing capable. When the next-hop from the list of next-hops is source routing capable, the network node proceeds to step 612; otherwise, the network node proceeds to step 616. At step 612, the network node sets the destination address of the source routed data packet to the next-hop indicated by the list of next-hops. At step 614, the network node forwards the source routed data packet toward the next-hop indicated by the destination address in the source routed data packet. Returning to step 610, when the next-hop from the list of next-hops is not source routing capable, the network node proceeds to step 616. At step 616, the network node sets the destination address of the source routed data packet to the next source routing capable next-hop in the list of next-hops and may proceed to step 614.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A service chaining method, comprising:
   receiving a source routed data packet that comprises a destination address, and wherein the source routed data packet identifies a plurality of next-hops along a service chain path;
   identifying a next-hop for the source routed data packet using the plurality of next-hops;
   determining whether the next-hop is source routing capable;
   setting the destination address of the source routed data packet in accordance with the determination, and wherein the destination address is set to a subsequent next-hop obtained from the service chain path of the received source routed data packet when the next-hop is not source routing capable; and
   forwarding the source routed data packet to the next-hop.

2. The method of claim 1, wherein determining whether the next-hop is source routing capable comprises examining one or more flag bits associated with the next-hop.

3. The method of claim 1, wherein determining whether the next-hop is source routing capable comprises using a table that describes the capabilities of the plurality of next-hops.

4. The method of claim 1, wherein the plurality of next-hops identifies one or more network nodes that are source routing capable and zero or more network nodes that are not source routing capable.

5. The method of claim 1, wherein the source routed data packet is forwarded to the next-hop using one or more tunnels.

6. The method of claim 1, further comprising:
   determining whether the source routed data packet has reached the destination address;
   preserving the destination address when the source routed data packet has not reached the destination address; and
   forwarding the source routed data packet in accordance with the destination address.

7. The method of claim 1, wherein at least one of the next-hops of the plurality of next-hops is a service function.

8. An apparatus comprising:
a receiver configured to receive a source routed data packet, wherein the source routed data packet comprises a destination address and a plurality of next-hops along a service chain path; and
a processor coupled to a memory and the receiver, wherein the memory comprises computer executable instructions stored in a non-transitory computer readable medium such that when executed by the processor causes the processor to:
identify a next-hop for the source routed data packet from the plurality of next-hops;
determine whether the next-hop is source routing capable;
set the destination address of the source routed data packet, wherein the destination address is set to the next-hop in the service chain path when the next-hop is source routing capable, and wherein the destination address is set to a subsequent next-hop obtained from the service chain path of the received source routed data packet that is source routing capable when the next-hop is not source routing capable; and
forward the source routed data packet to the next-hop.

9. The apparatus of claim 8, wherein determining whether the next-hop is source routing capable comprises examining one or more flag bits associated with the next-hop.

10. The apparatus of claim 8, wherein determining whether the next-hop is source routing capable comprises using network topology information.

11. The apparatus of claim 8, wherein the plurality of next-hops identifies one or more network nodes that are source routing capable and zero or more network nodes that are not source routing capable.

12. The apparatus of claim 8, wherein the source routed data packet is forwarded to the next-hop using one or more direct links.

13. The apparatus of claim 8, wherein the computer executable instructions further cause the processor to:
determining whether the source routed data packet has reached the destination address;
preserving the destination address when the source routed data packet has not reached the destination address; and
forwarding the source routed data packet in accordance with the destination address.

14. The apparatus of claim 8, wherein at least one of the next-hops of the plurality of next-hops is a firewall or an intrusion prevention system (IPS).

15. The method of claim 1, wherein the destination address is set to the next-hop in the service chain path when the next-hop is source routing capable.

16. The method of claim 1, wherein the destination address that is set to a subsequent next-hop obtained from the service chain path of the received source routed data packet is an address of a source routing capable node.

* * * * *